(12) United States Patent
Takenawa

(10) Patent No.: US 6,316,037 B1
(45) Date of Patent: Nov. 13, 2001

(54) BEAN SOFTENING AGENT AND PROCESS FOR PRODUCING PROCESSED BEANS

(75) Inventor: Seishi Takenawa, Nara (JP)

(73) Assignee: Fujisawa Pharmaceutical Co., Ltd., Osaka (JP)

( * ) Notice: Subject to any disclaimer, the term of this patent is extended or adjusted under 35 U.S.C. 154(b) by 0 days.

(21) Appl. No.: 09/647,425

(22) PCT Filed: Feb. 22, 1999

(86) PCT No.: PCT/JP99/00800

§ 371 Date: Oct. 2, 2000

§ 102(e) Date: Oct. 2, 2000

(87) PCT Pub. No.: WO99/51113

PCT Pub. Date: Oct. 14, 1999

(30) Foreign Application Priority Data

Apr. 2, 1998 (JP) .................................................. 10-090273

(51) Int. Cl.[7] ................................ A23L 1/20; A23L 1/201
(52) U.S. Cl. ........................... 426/507; 426/508; 426/634; 426/442; 426/629

(58) Field of Search ..................................... 426/507, 508, 426/634, 442, 629

(56) References Cited

U.S. PATENT DOCUMENTS 3,718,479 * 2/1973 Kanno et al. .

FOREIGN PATENT DOCUMENTS

| 49-71155 | 7/1974 | (JP) . |
|---|---|---|
| 53-148560 | 12/1978 | (JP) . |
| 56-117774 | 9/1981 | (JP) . |
| 6-90695 | 4/1994 | (JP) . |
| 7-177860 | 7/1995 | (JP) . |
| 9-182564 | 7/1997 | (JP) . |

OTHER PUBLICATIONS

The Condensed Chemical Dictionary Edited by Rose et al. Published in 1969. p. 776.*

* cited by examiner

*Primary Examiner*—Anthony J. Weier
(74) *Attorney, Agent, or Firm*—Oblon, Spivak, McClelland, Maier & Neustadt, P.C.

(57) ABSTRACT

A bean softening agent containing an alkali metal gluconate.

13 Claims, No Drawings

BEAN SOFTENING AGENT AND PROCESS FOR PRODUCING PROCESSED BEANS

TECHNICAL FIELD

This invention relates to a tenderizer for pulses (hereinafter referred to sometimes as bean tenderizer) which is added to water in the production of processed pulses, such as boiled beans, natto, soy-cooked beans, etc., by boiling or steaming pulses such as soybeans and azuki beans. The bean tenderizer according to this invention is capable of processing pulses to a tender and uniformly firm consistency in a short period of time regardless of the variety of pulses, without loss of the inherent nutrients of material pulses, fully retaining the nutritional value of pulses even after processing and without a risk for environmental pollution associated with the disposal of waste water, thus being remarkably useful.

BACKGROUND ART

For the production of miso, soy, natto, boiled beans, soy-cooked beans, etc. through processing of pulses such as soybeans and azuki beans, it is common practice to soak raw pulses in water for a certain time period to let them absorb water, boil the soaked pulses in water or steam them in a pressure cooker or the like, and subject them to further processings. In such a production process, it is important to strike a balance between tenderness and firmness of boiled or steamed pulses, and the nutritional value of the end product depends largely on whether said balance can be achieved by judicious process control.

Heretofore, for the purpose of tenderizing pulses to a uniform firmness, addition of phytic acid or a phosphate salt (e.g. sodium pyrophosphate) to soaking water has been practiced. However, the use of phytic acid or a phosphate salt results in various problems, for example in the case of the phosphate salt, the absorption of minerals is inhibited, leading to major changes in the post-processing nutritional value of pulses with the inherent nutrients being more or less deprived of. In addition, an adverse influence on the environment is also apprehended in the disposal of waste water.

Having been made in view of the above situation, the present invention has for its object to provide a novel bean tenderizer which enables the production of quality processed pulses with an assured balance between tenderness and firmness with ease, is capable of drawing out the inherent nutrients of pulses unaffected, and is eco-friendly, and a technology by which processed pulses can be produced with good efficiency.

DISCLOSURE OF INVENTION

The bean tenderizer of the invention which has accomplished the above object is characterized in that it contains an alkali metal salt of gluconic acid.

The method of producing processed pulses according to this invention is characterized in that pulses are immersed in water to which said bean tenderizer has been added.

The inventors of this invention did many investigations and found that when an alkali metal salt of gluconic acid is added to water in which pulses are soaked, processed pulses having both a uniform firmness and an adequate tenderness are obtained. This invention is based on the above finding.

As mentioned above, the bean tenderizer of this invention comprises an alkali metal salt of gluconic acid. The alkali metal salt of gluconic acid includes sodium gluconate and potassium gluconate, and these may be used alone or in a combination of two species.

The bean tenderizer of this invention should contain an alkali metal gluconate as an indispensable ingredient but, for the purpose of imparting other characteristics, sodium chloride, vitamins and minerals, among others, may be supplementally contained in amounts not interfering with the effect of the invention.

The method of producing processed pulses using the bean tenderizer of the invention is now described. A typical procedure may comprise adding the bean tenderizer of the invention to water in which pulses are immersed, allowing them to be soaked for a given period of time to let them absorb water, and either cooking them in boiling water or under pressure in a pressure cooker or the like.

The amount of said alkali metal gluconate to be added to water in which pulses have been immersed is preferably 0.3~5 weight %. Below 0.3 weight %, the desired effect will not be obtained. The more preferred level of addition is not less than 0 5 weight % and the still more preferred level is not less than 1 weight %. On the other hand, exceeding 5 weight % will result only in a saturation of effect and be uneconomical.

As to other process parameters (soaking time, heating conditions such as heating temperature and time), a suitable range can be selected for each parameter according to the variety of pulses used and the level of use of the alkali metal gluconate. As far as soaking time is concerned, the recommended time is 5~24 hours.

The pulses which can be used in the practice of this invention include soybean, azuki bean, kidney bean, garden pea, cow pea, horse bean, chick pea, lima bean, mung bean and kintoki bean (large azuki bean), among others. As processed pulses obtainable from such pulses, there can be mentioned miso, soy, natto, boiled beans, sweetened azuki beans and soy-cooked pulses, among others.

The following example is further illustrative of the invention. It should, however, be understood that the following example is not limitative of the invention and within the ranges defined hereinabove and below, many modifications may be made without departing from the technical scope of the invention.

EXAMPLES

Three varieties of pulses [soybeans, qìng dàdòu (green soybeans) and Taisho kintoki beans] were steam-cooked under the conditions mentioned below and cooled. The cooked pulses were placed on a 1 kg platform scale and each piece was crushed with a fingertip. The load reading of the platform scale was recorded and used as a marker of tenderness. This procedure was repeated for 100 pieces of each variety of pulses. The bean tenderizers used in this example were sodium gluconate (GNA) and potassium gluconate (GK) (=this invention), and phytic acid and sodium pyrophosphate (=prior art) Control pulses not treated with any bean tenderizer were also included in the test, and the results were compared.

(1) Pulses washed with water (2 hours in tap water, overflow)

(2) Soaking (22 hr)

(3) Boiling or steaming [pressurized in a pressure cooker (1.3 kg/cm$^2$)]

Soybeans . . . 30 min.;

Qìng dàdòu . . . 12 min.;

Taisho kintoki beans . . . 12 min.

(4) Allowed to cool (3 hr)

(5) Measurement of load to crush

The results are also set forth in Tables 1~3.

TABLE 1

Soybean

| Load (g) | Not added | GNK 0.5% | GNK 1.0% | GNK 3.0% | GK 0.5% | GK 1.0% | GK 3.0% | Phytic acid | Na pyro-phosphate |
|---|---|---|---|---|---|---|---|---|---|
| 111~130 | | | | | | 2 | | | |
| 131~150 | | | | | | 2 | | | 1 |
| 151~170 | | | | | 1 | 22 | | 6 | 8 |
| 171~190 | | | | 2 | 2 | 36 | 7 | 14 | 10 |
| 191~210 | | | | 4 | 8 | 17 | 16 | 18 | 12 |
| 211~230 | | 3 | 6 | 20 | 17 | 10 | 27 | 22 | 25 |
| 231~250 | | 0 | 17 | 42 | 17 | 5 | 18 | 16 | 16 |
| 251~270 | 1 | 1 | 12 | 11 | 14 | 3 | 15 | 10 | 7 |
| 271~290 | 8 | 15 | 29 | 12 | 19 | 2 | 9 | 4 | 5 |
| 291~310 | 12 | 5 | 9 | 1 | 5 | 0 | 1 | 6 | 9 |
| 311~330 | 15 | 17 | 17 | 5 | 5 | 1 | 1 | 0 | 3 |
| 331~350 | 8 | 19 | 3 | 3 | 5 | | 2 | 3 | 1 |
| 351~370 | 3 | 8 | 5 | | 4 | | 1 | 0 | 1 |
| 371~390 | 17 | 11 | 2 | | 0 | | 1 | 0 | 1 |
| 391~410 | 9 | 6 | | | 1 | | 1 | 0 | 0 |
| 411~430 | 18 | 11 | | | 2 | | 1 | 0 | 1 |
| 431~450 | 6 | 3 | | | | | | 0 | |
| 451~470 | 1 | 1 | | | | | | 1 | |
| 471~490 | 0 | | | | | | | | |
| 491~510 | 1 | | | | | | | | |
| 511~530 | 1 | | | | | | | | |
| Total | 100 | 100 | 100 | 100 | 100 | 100 | 100 | 100 | 100 |
| Average | 364.4 | 343.8 | 283.6 | 247.8 | 263.8 | 189.8 | 240.0 | 227.6 | 233.4 |
| Standard deviation, σ | 55.6 | 52.4 | 38.2 | 32.4 | 51.0 | 33.0 | 45.2 | 47.1 | 51.1 |

TABLE 2

Qìng dàdòu

| Load (g) | Not added | GNK 0.5% | GNK 1.0% | GNK 3.0% | GK 0.5% | GK 1.0% | GK 3.0% |
|---|---|---|---|---|---|---|---|
| 111~130 | | | | | | | 3 |
| 131~150 | | | | | | | |
| 151~170 | | | | | | | 7 |
| 171~190 | | | | | | 4 | 22 |
| 191~210 | | | | 4 | | 15 | 16 |
| 211~230 | | | | 21 | 3 | 23 | 18 |
| 231~250 | | | 2 | 22 | 7 | 8 | 15 |
| 251~270 | | 2 | 6 | 25 | 26 | 17 | 7 |
| 271~290 | 2 | 5 | 7 | 9 | 16 | 7 | 6 |
| 291~310 | 2 | 22 | 18 | 9 | 14 | 8 | 5 |
| 311~330 | 7 | 18 | 20 | 5 | 9 | 5 | 0 |
| 331~350 | 11 | 13 | 12 | 3 | 9 | 7 | 0 |
| 351~370 | 14 | 11 | 19 | 0 | 7 | 0 | 1 |
| 371~390 | 2 | 7 | 4 | 2 | 3 | 3 | |
| 391~410 | 8 | 11 | 5 | | 4 | 1 | |
| 411~430 | 18 | 10 | 5 | | 0 | 2 | |
| 431~450 | 7 | 1 | 0 | | 0 | | |
| 451~470 | 7 | | 0 | | 0 | | |
| 471~490 | 2 | | 2 | | 2 | | |
| 491~510 | 5 | | | | | | |
| 511~530 | 9 | | | | | | |
| 531~550 | 0 | | | | | | |
| 551~570 | 3 | | | | | | |
| 571~590 | 0 | | | | | | |
| 591~610 | 2 | | | | | | |
| 611~630 | 1 | | | | | | |
| Total | 100 | 100 | 100 | 100 | 100 | 100 | 100 |
| Average | 416.4 | 343.6 | 333.0 | 258.0 | 299.4 | 258.4 | 215.6 |
| Standard deviation, σ | 75.6 | 44.8 | 46.8 | 37.5 | 51.0 | 55.8 | 43.0 |

TABLE 3

Taisho kintoki bean

| Load (g) | Not added | GNK 0.5% | GNK 1.0% | GNK 3.0% | GK 0.5% | GK 1.0% | GK 3.0% |
|---|---|---|---|---|---|---|---|
| 391~410 | | | | 1 | | | |
| 411~430 | | | | 0 | | 1 | |
| 431~450 | | | | 0 | | 0 | |
| 451~470 | | | | 0 | | 0 | |
| 471~490 | 2 | | 2 | 0 | | 0 | |
| 491~510 | 0 | | 0 | 7 | | 3 | 6 |
| 511~530 | 7 | 1 | 0 | 6 | 3 | 18 | 4 |
| 531~550 | 7 | 0 | 2 | 0 | 7 | 0 | 5 |
| 551~570 | 4 | 2 | 1 | 2 | 4 | 6 | 3 |
| 571~590 | 6 | 5 | 0 | 1 | 8 | 7 | 4 |
| 591~610 | 3 | 4 | 11 | 11 | 9 | 3 | 10 |

TABLE 3-continued

| Load (g) | Not added | GNK 0.5% | GNK 1.0% | GNK 3.0% | GK 0.5% | GK 1.0% | GK 3.0% |
|---|---|---|---|---|---|---|---|
| Taisho kintoki bean | | | | | | | |
| 611~630 | 2 | 0 | 4 | 4 | 3 | 10 | 17 |
| 631~650 | 12 | 2 | 6 | 8 | 10 | 14 | 11 |
| 651~670 | 2 | 7 | 7 | 10 | 12 | 6 | 12 |
| 671~690 | 7 | 7 | 7 | 17 | 12 | 8 | 16 |
| 691~710 | 15 | 2 | 6 | 3 | 9 | 3 | 2 |
| 711~730 | 4 | 3 | 5 | 10 | 7 | 7 | 5 |
| 731~750 | 7 | 9 | 13 | 2 | 4 | 2 | 1 |
| 751~770 | 3 | 10 | 2 | 4 | 4 | 4 | 2 |
| 771~790 | 4 | 8 | 10 | 6 | 2 | 7 | 0 |
| 791~810 | 6 | 0 | 5 | 6 | 3 | 0 | 2 |
| 811~830 | 0 | 3 | 5 | 0 | 0 | 1 | |
| 831~850 | 0 | 3 | 0 | 0 | 0 | | |
| 851~870 | 2 | 14 | 4 | 2 | 3 | | |
| 871~890 | 7 | 0 | 2 | | | | |
| 891~910 | | 5 | 4 | | | | |
| 911~930 | | 7 | 0 | | | | |
| 931~950 | | 2 | 4 | | | | |
| 951~970 | | 3 | | | | | |
| 971~990 | | 3 | | | | | |
| Total | 100 | 100 | 100 | 100 | 100 | 100 | 100 |
| Average | 675.4 | 773.2 | 723.0 | 661.0 | 658.4 | 630.0 | 630.2 |
| Standard deviation, σ | 104.2 | 110.6 | 102.9 | 90.8 | 78.1 | 86.4 | 65.7 |

It will be apparent from the above tables that whereas all the pulses treated with the bean tenderizer of the invention gave uniformly firm processed pulses on simple soaking and boiling or steaming, the use of the conventional bean tenderizers invariably resulted in mere softening of pulses and failed to give a suitable degree of firmness. Moreover, when no bean tenderizer was used, softening as such could be accomplished only with considerable difficulties.

INDUSTRIAL APPLICABILITY

Processed pulses according to this invention being constituted as above, quality processed pulses with a good balance between tenderness and firmness can be provided with convenience Furthermore, with the bean tenderizer of the invention, the inherent nutrients of pulses can be brought out unaffected and, moreover, there is no risk for environmental pollution associated with disposal of waste water so that the invention is remarkably useful from ecological points of view as well as nutritional points of view.

What is claimed is:

1. A method, comprising:
   contacting at least one pulse with a composition comprising water and an alkali metal salt of gluconic acid for a time sufficient for said pulse to absorb water.

2. The method of claim 1, wherein said alkali metal salt of gluconic acid is selected from the group consisting of sodium gluconate, potassium gluconate, and mixtures thereof.

3. The method of claim 1, wherein said composition further comprises at least one selected from the group consisting of sodium chloride, vitamins, and minerals.

4. The method of claim 1, wherein said contacting comprises immersing or soaking said pulse in said composition.

5. The method of claim 1, wherein said contacting comprises adding said alkali metal salt of gluconic acid to water in which said pulse is immersed.

6. The method of claim 1, further comprising boiling or steaming said pulse or cooking said pulse under pressure in a pressure cooker.

7. The method of claim 1, further comprising washing said pulse with water.

8. The method of claim 1, wherein said alkali metal salt of gluconic acid is present in an amount of 0.3~5 wt. %, based on the weight of said composition.

9. The method of claim 1, wherein said alkali metal salt of gluconic acid is present in an amount of not less than 0.5 wt. % based on the weight of said composition.

10. The method of claim 1, wherein said alkali metal salt of gluconic acid is present in an amount of not less than 1 wt. % based on the weight of said composition.

11. The method of claim 1, wherein said contacting comprises soaking said pulse for 5~24 hours.

12. The method of claim 1, wherein said pulse is selected from the group consisting of soybean, azuki bean, kidney bean, garden pea, cow pea, horse bean, chick pea, lima bean, mung bean, kintoki bean and large azuki bean.

13. The method of claim 1, wherein at least one processed pulse selected from the group consisting of miso, soy, natto, boiled beans, sweetened azuki beans, and soy-cooked pulses is obtained.

* * * * *